(12) United States Patent
Coperet et al.

(10) Patent No.: US 12,332,218 B2
(45) Date of Patent: Jun. 17, 2025

(54) METHOD FOR DETECTING DISCONTINUITIES AND SYSTEM FOR IMPLEMENTING SAID METHOD

(71) Applicant: SOCOMATE INTERNATIONAL, Crecy la Chapelle (FR)

(72) Inventors: Philippe Coperet, Crecy la Chapelle (FR); Liévin Camus, Crecy la Chapelle (FR); Jean-Marc Carpeza, Crecy la Chapelle (FR)

(73) Assignee: SOCOMATE INTERNATIONAL, Crecy la Chapelle (FR)

( * ) Notice: Subject to any disclaimer, the term of this patent is extended or adjusted under 35 U.S.C. 154(b) by 358 days.

(21) Appl. No.: 18/014,652

(22) PCT Filed: Jun. 28, 2021

(86) PCT No.: PCT/FR2021/051187
§ 371 (c)(1),
(2) Date: Jan. 5, 2023

(87) PCT Pub. No.: WO2022/023632
PCT Pub. Date: Feb. 3, 2022

(65) Prior Publication Data
US 2023/0273161 A1    Aug. 31, 2023

(30) Foreign Application Priority Data
Jul. 30, 2020    (FR) ........................................ 2008097

(51) Int. Cl.
*G01N 29/26* (2006.01)
*G01N 29/04* (2006.01)
(Continued)

(52) U.S. Cl.
CPC ......... *G01N 29/262* (2013.01); *G01N 29/043* (2013.01); *G01N 29/069* (2013.01);
(Continued)

(58) Field of Classification Search
CPC .... G01N 29/043; G01N 29/262; G01N 29/11; G01N 2291/043; G01N 2291/044;
(Continued)

(56) References Cited

U.S. PATENT DOCUMENTS 6,234,025 B1 * 5/2001 Gieske ................... G10K 11/30
73/629
7,823,454 B2 * 11/2010 MacLauchlan ........ G01N 29/44
73/618

(Continued)

OTHER PUBLICATIONS

International Search Report for PCT/FR2021/051187, mailed Oct. 11, 2021, 4 pages.
(Continued)

*Primary Examiner* — Jacques M Saint Surin
(74) *Attorney, Agent, or Firm* — NIXON & VANDEHRYE (57) ABSTRACT

Disclosed is a method including the steps of defining a transmission sequence, in which a plurality of transmit transducers is uniformly and randomly selected among the transducers of a probe on the active surface of the probe and a time offset is uniformly and randomly defined for each transmit transducer over a predetermined transmission duration. Subsequently, the transmission sequence is transmitted in the medium by the plurality of transmit transducers, the reception signals are received and recorded and they are processed with a focal law suitable for the transmit transducers and the time offsets used in order to thus derive a level of detection.

14 Claims, 4 Drawing Sheets

(51) Int. Cl.
*G01N 29/06* (2006.01)
*G01N 29/11* (2006.01)

(52) U.S. Cl.
CPC ........ *G01N 29/11* (2013.01); *G01N 2291/011* (2013.01); *G01N 2291/015* (2013.01); *G01N 2291/106* (2013.01)

(58) Field of Classification Search
CPC ....... G01N 2291/015; G01N 2291/011; G01N 2291/106; G01N 2291/023
USPC .......................................................... 73/584
See application file for complete search history.

(56) References Cited

U.S. PATENT DOCUMENTS

| | | | | |
|---|---|---|---|---|
| 8,839,673 | B2* | 9/2014 | Rasselkorde | G01N 29/221 |
| | | | | 73/625 |
| 11,624,816 | B2* | 4/2023 | Pellegretti | A61B 8/4461 |
| | | | | 367/138 |

OTHER PUBLICATIONS

Written Opinion of the ISA for PCT/FR2021/051187, mailed Oct. 11, 2021, 7 pages.
Search Report for FR2008097, dated Mar. 23, 2021, 2 pages.
Davidsen et al., "Two-dimensional random arrays for real time volumetric imaging", *Ultrasonic Imaging*, vol. 16, Jan. 1, 1994, pp. 143-163, XP055786494.
Kruizinga et al., "Compressive 3D ultrasound imaging using a single sensor" *Science Advances*, vol. 3, No. 12, Dec. 1, 2017, p. e1701423, DOI: 10.1126/sciadv.1701423, XP055594656.
Rachlin et al., "Theoretical evaluation of some related methods for reducing acoustic speckle", Oct. 2, 1988; Oct. 2, 1988-Oct. 5, 1988, Oct. 2, 1988, pp. 827-832, XP010075565.
Holmes et al., "Post-processing of the full matrix of ultrasonic transmit-receive array data for non-destructive evaluation", *NDT&E International*, vol. 38, 2005, pp. 701-711, XP002802391.

* cited by examiner

METHOD FOR DETECTING DISCONTINUITIES AND SYSTEM FOR IMPLEMENTING SAID METHOD

This application is the U.S. national phase of International Application No. PCT/FR2021/051187 filed Jun. 28, 2021, which designated the U.S. and claims priority to FR Patent Application No. 2008097 filed Jul. 30, 2020, the entire contents of each of which are hereby incorporated by reference.

TECHNICAL FIELD

This invention relates to a method for detecting discontinuities in a product, in particular by the use of ultrasonic-wave probing.

PRIOR ART

Many techniques exist for detecting discontinuities or defects in a product, for example a metal product. These techniques fall within the field of non-destructive testing. Techniques using the propagation of ultrasonic waves are highly effective in detecting discontinuities or defects in the material of the product after its manufacture or during its lifetime to ensure it is working properly.

Thus, patent document FR 2 830 328 shows a method for detecting discontinuities using several beams simultaneously in several directions, but such a method produces interference at reception, and the signal-to-noise ratio is degraded in comparison to a single-beam method.

The document "*Post-processing of the full matrix of ultrasonic transmit-receive array data for non-destructive evaluation*", NDT&E International 38 (2005) 701-711, evaluates a technique for capturing a full matrix of time-domain signals between all transmit and receive transducer pairs. These time-domain signals are then processed in post-processing, for example by a focusing algorithm at each point of the medium.

However, in this technique, each transducer transmits, one after the other, the receive signals from all the transducers are ideally stored between each firing. This method is therefore unsatisfactory for problems concerning the speed of execution.

DISCLOSURE OF THE INVENTION

The aim of this invention is to improve methods of for detecting discontinuities of this type, in particular in order to improve the detection quality at high speeds.

To this end, the method for detecting discontinuities according to this disclosure is implemented using a probe comprising a plurality of transducers forming an active surface and able to transmit and receive an ultrasonic wave in the medium, the method comprising the steps of:
 defining a transmission sequence wherein:
  a plurality of transmit transducers are chosen among the transducers of the probe, each transmit transducer of the plurality of transmit transducers having a determined spatial position such that the spatial positions of the plurality of transmit transducers are uniformly and randomly distributed over the active surface of the probe, and
  a time offset is defined for each transmit transducer of the plurality of transmit transducers, such that the time offsets of the plurality of transmit transducers are uniformly and randomly distributed over a predetermined transmission duration,
 transmitting the transmission sequence in the medium, by the plurality of transmit transducers,
 receiving and recording reception signals, by the plurality of transducers, in response to the transmission sequence transmitted in the medium,
 processing the reception signals according to the following process, wherein:
  for each transmit transducer, a focusing delay corresponding to a determined focal law for the transmit transducer is calculated, for a desired target point to be probed in the medium, and taking into account the time offset of the transmit transducer considered,
  a focused signal is calculated for each transmit transducer, which is the sum of the reception signals of the plurality of transducers of the probe, realigned by the focusing delay,
  a synthetic signal is calculated which is the sum of the focused signals from all the transmit transducers, and
  the synthetic signal is analyzed in order to thus derive a level of detection in the medium at the target point, and detection of a discontinuity is thus derived.

By means of these arrangements, the probing method causes little interference, and the quality of the detection is improved, particularly at high speeds.

In particular, this method only needs a single transmission sequence. The detection and/or the image is done entirely in post-processing, and the particular sequence and possibly its processing makes it possible to avoid as much as possible the interference between the reception signals recorded and/or to reduce the effects of this interference, which allows providing fast and accurate discontinuity detection (amplitude of the level of detection).

In various embodiments of the method according to this disclosure, one or more of the following arrangements may further be used.

According to one aspect, the method further comprises, before the calculation of the focused signal, a step in which the interference between several discontinuities is reduced, by the process consisting of:
 determining a curve of peaks in the reception signals as a function of the transducers, said curve being determined by identifying the peaks in the reception signals for a target point and according to the focal law,
 calculating a model curve which approximates the curve of peaks, and
 calculating corrected reception signals from the recorded reception signals and the model curve, said corrected reception signals then being used instead of the recorded reception signals in the processing of these signals to derive the level of detection.

According to one aspect, the model curve is a polynomial curve.

According to one aspect, the focusing delay is determined as a function of the speed of movement of the medium relative to the probe, or vice versa.

According to one aspect, the processing of the reception signals is iterated for a plurality of target points, in order to establish an image of the medium that is representative of the different levels of detection in said target points.

This disclosure also relates to a system for detecting discontinuities which implements the above method. This system comprises a probe comprising a plurality of transducers able to transmit and receive an ultrasonic wave in the medium, and a processing unit connected to the probe, this processing unit comprising at least one memory for recording reception signals, and a controller to implement the method.

BRIEF DESCRIPTION OF DRAWINGS

Other features and advantages of the invention will become apparent from the following description of at least one of its embodiments, given as non-limiting examples, with reference to the attached drawings.

In the drawings.

In the various figures, the same reference numbers designate identical or similar elements.

DETAILED DESCRIPTION

An example embodiment of a system for detecting discontinuities or defects in a medium of a product, and an example of a method implemented by this system, are described below in an illustrative and non-limiting manner.

Figure 1:
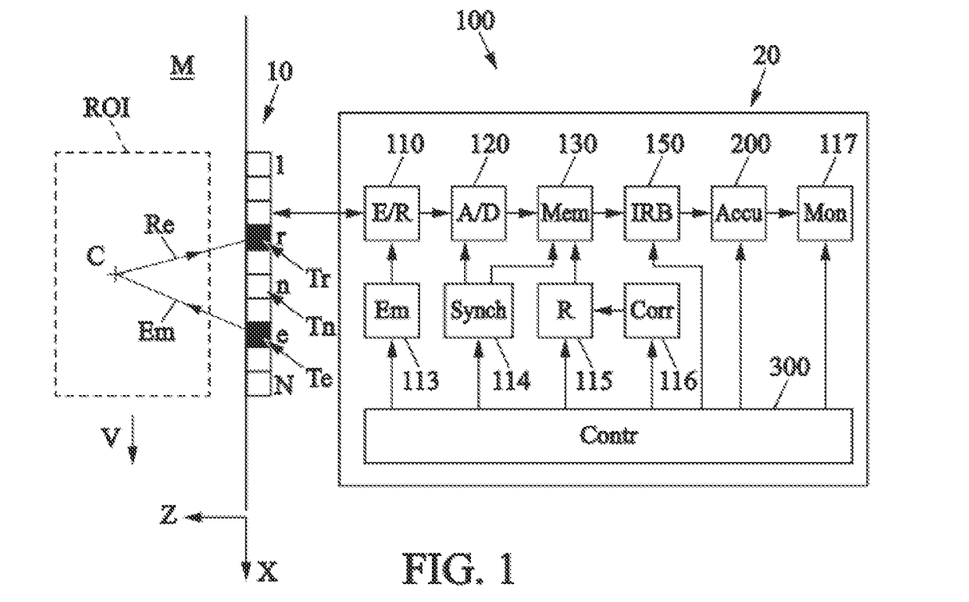
FIG. 1 is a general block diagram of an example of a system implementing the method according to the invention.

According to this example of a system according to the present disclosure and illustrated in FIG. 1, system 100 is a system for detecting discontinuities in a medium M. Medium M is for example a product such as a metal part which may comprise one or more discontinuities or defects within its material, such as one or more air pockets or cracks. The aim of the system and method is therefore to detect these discontinuities or defects. Detection is understood to mean for example obtaining information about the presence of a discontinuity, and/or obtaining distance information and/or obtaining positional information relative to the system, and/or obtaining information about the shape of the discontinuity. Possibly, the product corresponding to medium M moves at a relative speed with respect to system 100, which requires very fast detection of a discontinuity. For reliability in product control, it is important not to miss such a detection.

The system and method according to this disclosure apply for example to the non-destructive testing of metal products or parts such as tubes and rails of railways. In particular, the system and method is optionally used during movement of said product or while rolling along the rail.

FIG. 1 is an example of a functional block diagram of system 100 which has various processing blocks. System 100 may optionally be broken down into different functional blocks, but these would include the essential functions of the example of system 100 described below.

In the example of FIG. 1, system 100 comprises a probe 10 which exchanges signals with a processing unit 20 connected to the probe by an electrical or optical wired link, or a wireless link such as radio wave for example. Thus probe 10 may be located at a distance from processing unit 20. Optionally, probe 10 and processing unit 20 are integrated into a single device, or some of the elements (functions) of the processing unit are located in probe 10.

Probe 10 comprises for example a plurality of transducers Tn having an index n=1 . . . N, said transducers forming an active surface of the probe. The N transducers Tn are for example aligned along a longitudinal direction X as in FIG. 1. In practice, the number N of transducers is for example between a few tens and a few hundreds.

In the case of a one-dimensional linear probe, a transducer Tn of the probe has a spatial position indicated by the abscissa xn of this transducer along the longitudinal direction X of the probe. The depth direction Z perpendicular to the longitudinal direction X corresponds to the depthwise position in the medium, from an origin O placed on the outer surface of the medium M, at the contact between probe 10 and medium M. Origin O, longitudinal direction X, and depthwise direction Z form a frame of reference in which elements can be positionally identified by spatial coordinates (x,z).

Optionally, probe 10 may be a curved probe in the form of an arc of a circle, a planar array probe of N×P transducers, or an array probe in the form of a section of a cylinder, or any other probe shape. The system and method described herein will be readily adapted to such a probe.

Thus, the product is for example either static, or moving in translation or in rotation relative to probe 10 of the system, or the reverse (probe is moving relative to the product).

The active surface of probe 10 is brought into direct or indirect contact with an external surface of medium M. Each transducer Tn of probe 10 is an element able to transmit a transmission wave in medium M and/or to receive a return wave in the medium in response to the nature of the medium. The wave is usually an ultrasonic wave. For example, as represented in FIG. 1, a transmit transducer Te of index e and of coordinates (xe, 0) transmits a transmission wave Em towards a target point C inside the medium, and the medium returns a return wave Re from this target point C for example towards a receive transducer Tr of index r and of coordinates (xr, 0). A region of interest ROI for probing for discontinuities or defects in the medium is defined. Such a region of interest is for example rectangular with sides parallel to the directions of the frame of reference.

The transducers Tn of probe 10 receive signals to transmit the transmission wave and generate signals upon receiving the return wave. The transducers of probe 10 are thus connected to a transmit-receive module 110 (also identified by "E/R"). The transmit-receive module 110 transfers to the transducers either the transmission signals prepared by the system in a transmitter control unit 113 (also identified by "Em" in the figure), or the reception signals coming from the transducers to one or more analog-to-digital converters 120 (also identified by "A/D" in the figure) which digitize and convert these analog reception signals into digital data, these digital data then being stored in one or more memories 130 (also identified by "Mem" in the figure) of the system.

Transmit-receive modules 110 are known and enable sequential use of the transducers of probe 10 during either wave transmission or wave reception. They also comprise, for example, and without being limited thereto:

in the transmission chain, transmission pulsers which generate the transmission signals, typically pulses of programmable amplitude and time width, and in the reception chain, programmable-gain amplifiers and anti-aliasing filters.

The transmission signals and waves are typically pulses of short duration. These pulses are, for example, single or multiple rectangular signals, possibly of variable amplitudes, or signals modulated according to one or more frequencies, or a combination of such signals. The return waves and signals are return echoes corresponding to these transmission pulses, deformed by their transmission in the medium. For simplicity in the explanations, "pulses" will be used more generally to refer to both.

As illustrated in FIG. 1, system 100 further comprises a synchronization module 114 (also identified as "Synch" in the figure) connected to analog-to-digital converters 120 and to memory 130, which allows triggering the digitization (analog-to-digital conversions) of the reception signals into digital data and saving these in memory 130.

In addition, system 100 may optionally comprise an interference reduction block 150 (also identified as "IRB" in the figure) connected to memory 130, its function being to modify the digital data of the reception signals in order to eliminate or reduce interference in the reception signals due to the presence of several discontinuities or defects in the medium, by correcting the digital data. This interference reduction block will be described in more detail below.

System 100 then comprises a summation block 200 (also identified by "Accu" in the figure) connected to the above memory block 130 and/or to interference reduction block 150, and which carries out the calculation of the medium's response at one or more target points C, either directly from the data of memory 130, or from corrected data coming from interference reduction block 150, or from a combination of the two. Summation block 200 then provides a response to a monitor, screen, or any display device 117 (also identified by "Mon" in the figure) to inform the system user of one or more items of information concerning discontinuities or defects in the medium (presence, position, shape, image, etc.). This summation block 200 will be described in more detail below.

System 100 comprises a delay calculator 115 (also identified as "R" in the figure) which determines the time delays or the index of the position in memory 130 of portions of the digital data (i.e. reception signals) useful for the following block(s), i.e. interference reduction block 150 and/or summation block 200.

System 100 also optionally comprises a dynamic speed corrector 116 (also identified as "Corr" in the figure) which uses a product speed measurement measured by one or more sensors (not shown) and is connected to delay calculator 115 in order to compensate for the movement of the product (i.e. of the medium) during propagation of transmission wave Em from probe 10 towards target point C and during propagation of return wave Re from target point C towards probe 10.

Finally, a controller 300 (also identified as "Contr" in the figure) is linked to the various abovementioned blocks in order to manage the general operation. More specifically, controller 300 is connected to transmitter control unit 113 in order to transmit transmission wave Em according to a transmission procedure predetermined by the user, to synchronization module 114 in order to ensure correct acquisition of return wave Re, to delay calculator 115 in order to ensure combinations of reception signals adapted to the desired focus, to dynamic speed corrector 116, to interference reduction block 150 in order to provide it with user operating parameters, to the beamforming block in order to control its calculation and correction parameters, and to screen 117 in order to give shape to various displays and control elements of system 100.

The operation of system 100 is now described.

In particular, controller 300 and control unit 113 of system 100 according to this disclosure construct a transmission sequence for a particular transmission wave Em.

According to a first prior art, several transmit transducers Te each generate a pulse with a predetermined time offset so that the transmission wave generated is physically a wave focused towards a target point in the medium. Thus, several transmission wave firings are carried out successively, each followed by waiting for the return wave and storing the reception signals in order to scan multiple points in the medium and possibly construct an image. This technique therefore involves numerous firings of transmission waves. This method is particularly slow for probing a large region of interest or at a spatially precise resolution. In addition, it makes it almost impossible to probe a product which is moving at significant speed in front of the probe.

According to a second prior art, one or more firings of unfocused waves such as a plane wave are used to scan a region of interest in the medium. Processing the signals of the return wave makes it possible to obtain information and generate a quick image of the region of interest. However, the quality of the generated images is not good because, since the energy of the transmission wave is widely distributed spatially, the signal-to-noise ratio is degraded.

According to a third prior art, one firing is made for each transducer of the probe, and the signals of the return waves are recorded. This technique of recording the full matrix of signals, as used in *"Post-processing of the full matrix of ultrasonic transmit-receive array data for non-destructive evaluation"*, NDT&E International 38 (2005) 701-711, results in a slow method of detection due to the multiple firings required.

The present disclosure therefore proposes a particular transmission sequence in which a certain number of transmit transducers Te are selected quasi-randomly in probe 10, and/or the pulses of the transmission signals of these transmit transducers are shifted by a quasi-random time offset te. Thus, the reception signals will have little temporal coherence and little symmetry and the spatial and temporal interference of the reception signals is reduced, in particular in the presence of multiple discontinuities in the product medium. This therefore makes it possible to improve the quality of the detection of said discontinuities (information or image). In addition, this transmission sequence makes it possible to probe substantially the entire region of interest ROI of the medium using a single transmission firing and the return wave from this firing. This technique is therefore fast and suitable for probing a product that is moving relative to probe 10 of the system, for example at a speed V. Speed V is assumed to be substantially constant during the probing process.

This transmission sequence is produced for example according to the following process:

a plurality of Ne transmit transducers Te is chosen among the N transducers Tn of probe 10, each transmit transducer of the plurality of transmit transducers having a spatial position xed determined in such a way that the spatial positions of the plurality of transmit transducers are distributed uniformly and randomly on the active surface of probe 10, and a time offset te is defined for each transmit transducer Te among the plurality of Ne transmit transducers, such that the time offsets te of the plurality of Ne transmit transducers are distributed uniformly and randomly over a predetermined transmission duration DTe, corresponding to the maximum duration of a firing in medium M.

This transmission sequence thus defines transmit transducers Te and time offsets te, each of the time offsets being respectively associated with a transmit transducer among the plurality of transmit transducers. The transmission sequence therefore defines wave transmissions (ultrasound) for Ne transmit transducers, at time instants te relative to an initial reference time t0 for the transmission sequence. Each transmission of the sequence from a transmit transducer Te is a pulse of very short duration. These transmissions of ultrasonic pulses are therefore distributed spatially according to the transmit transducers and temporally within a transmission duration DTe of the transmission sequence.

The selected number Ne of transmit transducers Te is two or more. Preferably, the selected number Ne of transmit transducers Te is greater than or equal to five or ten, and this number depends on the number N of transducers of the probe. This number Ne of transmit transducers is less than the number N of transducers of the probe.

For example, the selected number Ne of transmit transducers Te is between 0.05×N and 0.25×N, i.e. between 5% and 25% of the transducers of probe 10. Thus, within this range of transducer usage, it is possible to obtain better qualities of detection of discontinuities.

In effect, the technician will adjust the density of the transmit transducers and the density of the signals of the transmission sequence in a compromise for improving the quality of detection and according to the application.

These spatial and temporal distributions are said to be done "uniformly and randomly", which means that the transmissions are substantially spaced well apart from each other, but with random differences or deviations, within the spatial dimension and the temporal dimension. In other words, these transmission distributions are not regularly spaced apart nor periodic in these two dimensions. These transmission distributions are also not purely random, since they are preferably spaced apart from each other.

Figure 2:
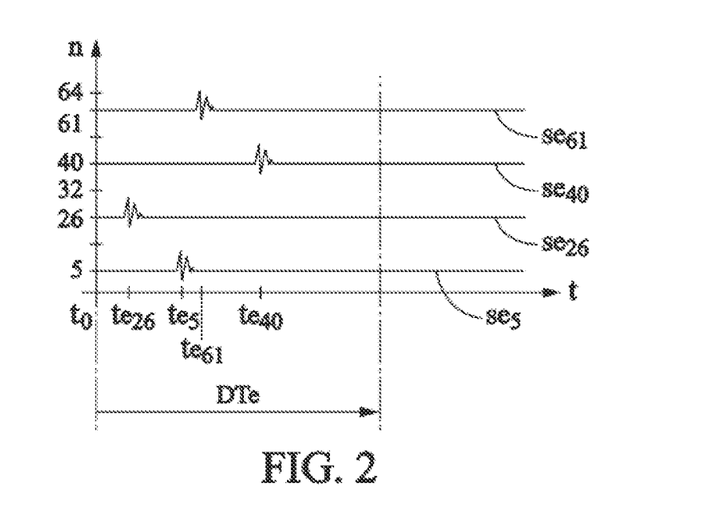
FIG. 2 is a timing diagram of the signals from the selected transmit transducers in an example of a transmission sequence of the method.

FIG. 2 illustrates an example of such a transmission sequence, for probe 10 having 64 transducers of which four (4) transmit transducers Te are selected. FIG. 2 shows the plots of the four transmission signals from the four transmit transducers chosen, here the transducers of indices 5, 26, 40, and 61. The transmission signals of the other transducers (transducers which are not transmit transducers) can therefore be zero and therefore they are not represented in FIG. 2. We therefore have transmission signals $se_5$, $se_{26}$, $se_{40}$, and $se_{61}$. These transmission signals are pulses which start at respective times $te_5$, $te_{26}$, $te_{40}$ and $te_{61}$, these times being quasi-random or rather being distributed in a uniform and random manner within transmission duration DTe. Similarly, the indices of the transmit transducers Te are distributed in a quasi-random manner among the possible indices 1 . . . 64 of the transducers of probe 10, or rather are distributed in a uniform and random manner among the possible indices of the transducers.

A first technique for obtaining a uniform and random distribution, in the spatial or temporal dimension, is simply to define a random value within the size interval of the spatial or temporal dimension; in other words:

for the spatial dimension of the transducers, a random value for a transducer index between 1 and N, N being the number of transducers of probe 10; and for the temporal dimension, a random value of a time instant between t0 the initial instant for the transmission sequence, and (t0+DTe) the maximum final instant of the transmission sequence, DTe being the transmission duration.

A second technique for obtaining a uniform and random distribution is to divide the spatial or temporal dimension into a number NI of contiguous intervals of constant and equal sizes, and to define a random value within each of said intervals.

This makes it possible to obtain values for the spatial or temporal dimension that are more evenly distributed over this dimension. Indeed, each of the NI intervals of the spatial or temporal dimension contains only one element.

A third technique for obtaining a uniform and random distribution is to divide the spatial or temporal dimension into a number NI of contiguous intervals of constant and equal sizes, and to define a value in each of said intervals that is relative to a median value MI of each interval. Thus, the value is equal to the median value to which is added a random value corresponding to a deviation from said median value. The random value can take positive or negative values, and its amplitude can for example be limited to half the size of the interval.

This makes it possible to obtain values for the spatial or temporal dimension that are more evenly distributed over this dimension. Indeed, not only do each of the NI intervals of the spatial or temporal dimension contain only one element, but that element is placed around a central value (which is the median value of the interval), with a deviation that can be controlled by the defined amplitude.

All these techniques are to be implemented by a technician specializing in the field who has knowledge of mathematics. But he or she may also use other techniques for the uniform and random distribution of values within the spatial and temporal space.

Thus, by at least one of these techniques, the technician will be able to determine transmit transducers Te of a predetermined number among the number N of transducers of the probe, and by at least one of these techniques will be able to determine the time offsets te associated with these transmit transducers, each of these time offsets being distributed between zero and Dte (the transmission duration). In particular, the number of intervals NI cited above is equal to the predetermined (selected) number Ne of transmit transducers Te.

The transmission sequence defined according to this disclosure makes it possible to reduce the amount of interference between pulses in the reception signals, and makes it possible to improve the detection of discontinuities, as will become more apparent with the following explanations.

Memory 130 of system 100 contains the N reception signals in the form of digital data, which constitutes a complete capture matrix of medium M for the Ne transmissions from transmit transducers Te during the transmission sequence, these transmissions each being shifted by time offset te in the firing of this transmission sequence.

Figure 3:
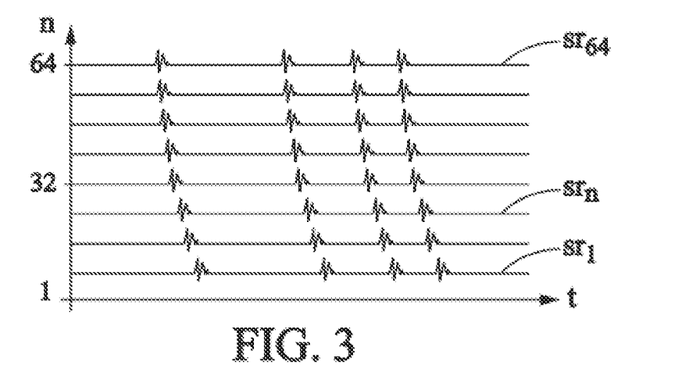
FIG. 3 is a timing diagram of the reception signals from the transducers of the probe according to the method.

FIG. 3 shows, for example, the N reception signals sr obtained and stored in memory 130 after the transmissions from four transmit transducers Te as represented in FIG. 2, in the presence of a single discontinuity or defect in medium M of the product. FIG. 3 shows a simplified representation of part of the 64 reception signals $sr_1$ to $sr_{64}$, to avoid too great a density in the plots in this figure. In addition, to assist the reader with understanding the figure, it and the subsequent figures assume the case of a linear probe, which simplifies the distribution of the signals.

The peaks in the pulses of these N reception signals form, in the present case of N transducers, curves which do not intersect and which correspond to the returns from the Ne transmission pulses. These curves are parallel curved lines, meaning they are separated from each other in the temporal direction by a constant which depends on the temporal deviations at transmission and on the position of the discontinuity in the medium.

Each of these N reception signals comprises Ne pulses, corresponding to the Ne returns from the single discontinuity in the corresponding receive transducer. The temporal spacings of these pulses depend on the temporal distribution of the Ne transmissions but also on the spatial position of the single discontinuity in medium M. However, the time offsets between two reception signals of two receive transducers Tr depend only on the spatial position of the single discontinuity in medium M.

Controller 300 extracts portions of the N reception signals from memory 130 for a target point C, a transmit transducer Te, and a receive transducer Tr, by programming delay calculator 115 with a focusing delay calculation, denoted Delay. This focusing delay calculation is for example the following:

$$Delay = te + tem + tre + tadj$$

where:
te is the time offset of the transmission from a transmit transducer,
tem is the outward travel time of the transmission wave from a transmit transducer Te to target point C in region of interest ROI,
tre is the return travel time of the return wave from target point C to any transducer of probe 10, and
tadj is a shift time to adjust to the maximum of the reception signals.

In particular, a simplified beamforming formulation for a linear transducer gives the following formulas via geometric calculations:

$$tem = 1/Va \cdot sqrt((xe-xc)^2 + zc^2)$$

$$tre = 1/Vr \cdot sqrt((xr-xc)^2 + zc^2)$$

(xe, ze), (xr, zr) and (xc, zc) being the coordinates in the coordinate system of transmit transducer Te, of the receive transducer, and of target point C, and ze, zr being zero for a linear probe,
Va is the speed of the transmission wave in the medium for the outward path between a transmit transducer Te and target point C,
Vr is the speed of the return wave in the medium for the return path between target point C and a receive transducer Tr, and
sqrt is the square root mathematical function.

The focusing delay of this disclosure is a calculation of the reception beamforming, but it differs from the usual reception beamforming delay by the addition of the time offset te used in the transmission sequence for each transmit transducer Te.

The above delay calculation may be expressed as a memory index in memory 130 by multiplying the outward travel time tem, the return travel time tre, and the time offset te, by a sampling frequency Fs in the case of a system sampled at such a constant sampling frequency.

Other formulations for the delay calculations are possible and accessible to the technician specializing in the field. In particular, these formulations depend on the geometry of the probe, which changes the distances of the outward path for the transmission wave and of the return path for the return wave. Similarly, these formulations depend on taking into account an intermediate medium between the probe and the medium of the product, which also modifies the distance calculations in the paths.

It is possible to perform delay calculations for a focusing in a predetermined direction. In this case, the formulas for calculating the delay are different. The present description details and clarifies the operation in the case of focusing towards a target point, but it is within the reach of a technician skilled in the art to establish the other formulas for directional focusing, and to construct a method for detecting discontinuities and a system suitable for this other type of focusing.

Controller 300 therefore causes delay calculator 115 to calculate the focusing delay of the N reception signals in memory 130 for a target point C and a transmit transducer Te and a receive transducer Tr and it extracts from memory 130 signal excerpts corresponding to a focusing at target point C of region of interest ROI. We will call these signal excerpts, which are time-shifted by the focusing delay, reception phased signals, generally denoted sp.

Figure 4:
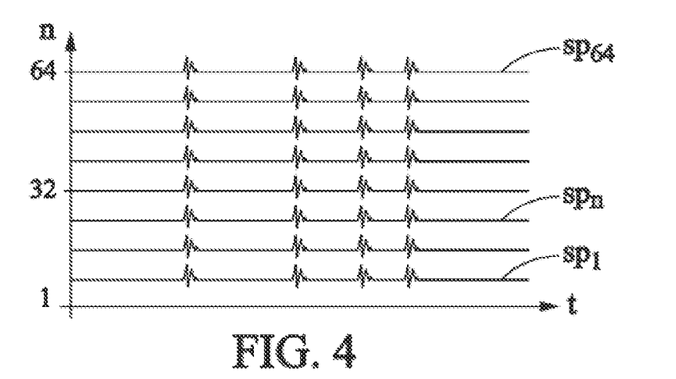
FIG. 4 is a timing diagram of the phased signals obtained by the focusing delays applied to the reception signals of FIG. 3.

If target point C is positioned at the location of a discontinuity, the above extraction of the reception phased signals (time-shifted by the focusing delay) will have the pulse peaks of the N receive transducers Tr, returned to temporal coherence as is represented in FIG. 4, which will allow obtaining by summation a focused signal (corresponding to a beamforming A-scan signal of the prior art) having a large amplitude, which means detection of a discontinuity at the spatial location of target point C.

If target point C is not positioned at the location of a discontinuity, the phased signals will not be vertically aligned with the pulse peaks as in FIG. 4, and a summation of these phased signals will not form a focused signal of large amplitude, which indicates the non-detection of a discontinuity at the spatial location of target point C.

The reception phased signals of FIG. 4 can be calculated for each transmit transducer Te, having a time offset te.

FIG. 4 therefore represents, in a simplified manner, part of the 64 reception phased signals $sp_1$ to $sp_{64}$, again in order to avoid excessively dense plots in this figure.

These reception phased signals sp are then supplied either directly to summation block 200, or supplied to interference reduction block 150 (optional) which corrects these signals before supplying them to summation block 200.

We will therefore first describe summation block 200 which carries out the processing of the reception phased signals in order to detect a discontinuity.

The general principle is a double summation: a first summation of the phased reception signals sp according to the indices of the N receive transducers Tr, in order to obtain a focused signal sf for each excitation of a transmit transducer Te (i.e. for each time offset te), then a second summation of said focused signals sf according to the indices of the Ne transmit transducers Te.

Figure 5:
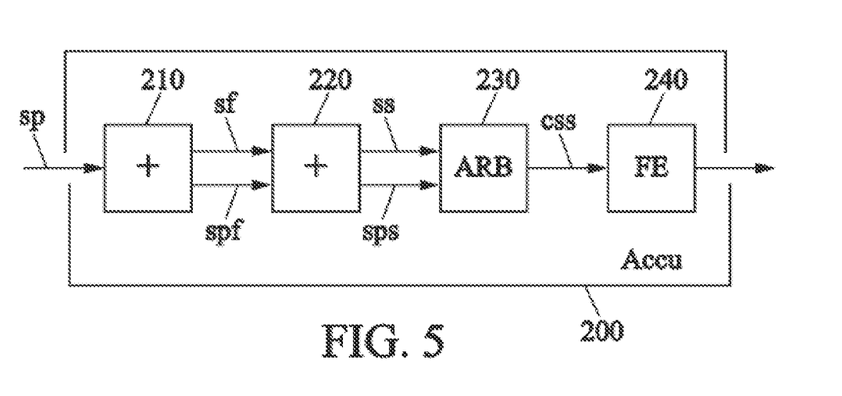
FIG. 5 is a block diagram of the summation block of FIG. 1.

FIG. 5 is an example of a functional block diagram of summation block 200 comprising various processing blocks which we will explain further.

In the example represented, summation block 200 comprises:

a first adder 210 which sums the N reception phased signals sp for a particular transmit transducer Te in order to provide a focused signal sf for transmit transducer Te, a second adder 220 which sums the Ne focused signals sf for each transmit transducer Te in order to provide a synthetic signal, and a filter and envelope detection block 240 to determine a level of the synthetic signal, denoted ss.

Optionally, summation block 200 further comprises an artifact reduction block 230 (also denoted "ARB" in FIG. 5) which is a block whose function is to reduce the background noise from the processing of system 100.

According to a first embodiment, first adder 210 and second adder 220 only sum the signals that they receive as input. First adder 210 sums the N reception phased signals sp of FIG. 4 in order to provide a focused signal sf (for all of transmit transducers Te). Second adder 220 sums the focused reception signals sf for all Ne transmit transducers in order to provide a synthetic signal ss.

Figure 6:
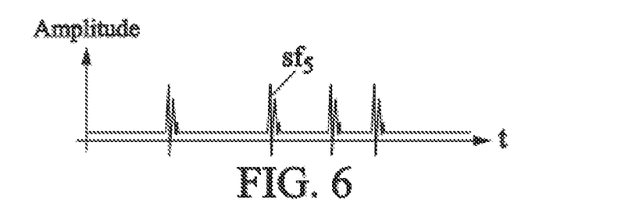
FIG. 6 is an example of a focused signal obtained by summation of the phased signals.

FIG. 6 shows an example of a focused signal sf for all of transmit transducers Te.

Similarly to the reception signals, the focused reception signal sf comprises the Ne return pulses of the Ne transmissions in the case of a single discontinuity. The temporal spacings of these pulses depend on the temporal distribution of the Ne transmission pulses and on the spatial position of target point C.

However, if the delay calculation does not correspond to focusing on a target point corresponding to a discontinuity, focused signal sf will have a different appearance with mixed multiple pulses of low amplitude spread out over time.

We therefore assume in FIG. 6 that the phased signals sp are correctly focused on a discontinuity in medium M, and we will maintain this assumption for the following illustrations for ease of understanding and for a simpler representation.

Figure 7:
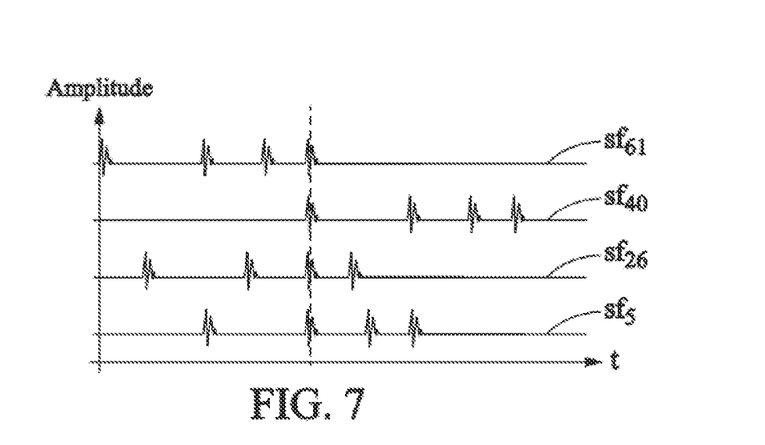
FIG. 7 is a timing diagram of the calculated focused signals relating to the selected transmit transducers.

FIG. 7 shows an example of four focused signals sf for each of the transmit transducers Te selected for the transmission sequence, and for example the transmit transducers of index 5, 26, 40 and 61 as selected previously, i.e. focused signals $sf_5$, $sf_{26}$, $sf_{40}$ and $sf_{61}$. These focused signals are transmitted from memory to summation block 200 either in parallel or in series, depending on the hardware implementation chosen (for example the amount of memory available in this hardware), the general operation being controlled by controller 300.

Figure 8:
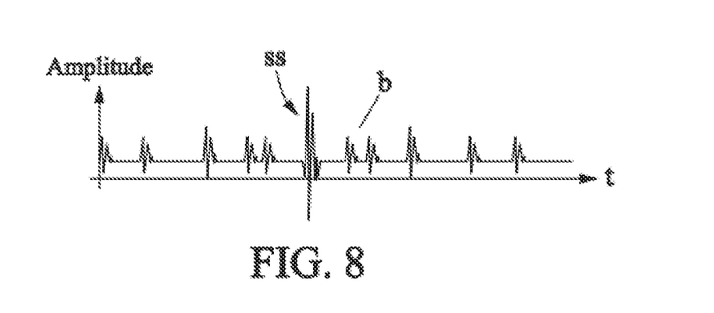
FIG. 8 is an example of a synthetic signal time plot calculated by summation of the focused signals of FIG. 7.

Second adder 220 thus takes all of the Ne focused signals sf of each transmission from the transmit transducers, and adds them up to obtain synthetic signal ss of FIG. 8.

In the case of focusing at a target point C corresponding to a discontinuity, the sum of the focused signals obtained for the various transmit transducers Te will be added together with good coherence at a combination time instant ts, to produce a synthetic signal ss such as the one in FIG. 8.

This synthetic signal comprises, at this combination time instant ts, a peak whose value represents the level of return wave Re for target point C concerned. However, even in this case, synthetic signal ss is a signal comprising a sum of pulses which form background noise b in the signal.

According to a second more perfected embodiment, as presented in FIG. 5, the signals are also summed as explained in the first embodiment, but phase calculations are also performed.

Thus, first adder 210 sums the reception phased signals to provide the focused signal, and also sums the phases of these signals to provide a focused phase signal intended for estimating the extent to which the reception phased signals are "in phase" (correlated) or not "in phase" (decorrelated) with each other. Thus, first adder 210 supplies a first signal which is the focused signal (A-scan signal) and a second signal which is a focused phase signal.

One way to calculate this sum of the phases is to sum the signs of the reception phased signals. If the signals are in phase, they have the same sign and the sum of the signs has a large absolute value. If the signals are not correctly in phase, the sum of the signs has a low absolute value. Other ways of calculating a sum of the phases can be developed by the technician skilled in the field.

Second adder 220 firstly sums the focused reception signals for all Ne transmit transducers in order to provide a synthetic signal.

Second adder 220 of FIG. 5 also sums the focused phase signals for all Ne transmit transducers in order to provide a synthetic phase signal.

As explained above for the phase signal, the synthetic phase signal has an absolute value which is all the greater when the signals are in phase and therefore correspond to a discontinuity.

Consequently, an artifact reduction block 230 placed at the output of second adder 220 uses the synthetic phase signal to correct the synthetic signal, and to improve its signal-to-noise ratio.

One basic way is to multiply the synthetic signal by the absolute value of the synthetic phase signal, normalized between zero and one. Thus, the amplitude of the synthetic signal is not modified if the phased signals are "in phase" and its amplitude is reduced if the phased signals are not "in phase". By means of this arrangement, a synthetic signal is obtained with a highly precise amplitude and with reduced background noise.

The technician skilled in the field may use other formulations, normalizations, and combinations of the synthetic signal and the synthetic phase signal to obtain a corrected synthetic signal css.

Lastly, filter and envelope detection block 240 collects either synthetic signal ss (case of the first embodiment) directly from second adder 220, or corrected synthetic signal css (case of the second embodiment) from artifact reduction block 230. Filter and envelope detection block 240 extracts from the input signal the peak value of this signal in order to determine the level of return wave Re for target point C concerned. This level allows estimating the presence of a discontinuity at the location of target point C.

Accordingly and in summary, system 100 according to this disclosure implements a method comprising the steps of:

defining a transmission sequence in which:
a plurality of transmit transducers Te are chosen among the transducers of the probe, each transmit transducer of the plurality of transmit transducers having a determined spatial position such that the spatial positions of the plurality of transmit transducers are uniformly and randomly distributed over the active surface of the probe, and a time offset to is defined for each transmit transducer Te of the plurality of transmit transducers, such that the time offsets of the plurality of transmit transducers are uniformly and randomly distributed over a predetermined transmission duration, transmitting the transmission sequence in the medium, by the plurality of transmit transducers, receiving and storing reception signals sr, by the plurality of transducers, in response to the transmission sequence transmitted in the medium, processing the reception signals according to the following process in which:

for each transmit transducer, a focusing delay corresponding to a determined focal law for the transmit transducer is calculated, for a target point in the desired region of interest to be probed in the medium, and taking into account the time offset of the transmit transducer considered, a focused signal sf is calculated for each transmit transducer, which is the sum of the reception signals of the plurality of transducers of the probe, realigned by the focusing delay, a synthetic signal ss is calculated which is the sum of the focused signals from all the transmit transducers, and the synthetic signal is analyzed in order to thus derive a level of detection in the medium at the target point, and detection of a discontinuity is thus derived.

The transmission sequence of the above method is sufficient for the process of processing the reception signal to probe the product medium in order to detect discontinuities in the region of interest ROI at any target point or in any direction. This transmission sequence is therefore very effective for rapidly probing the medium, and for avoiding or reducing interference in the reception signals sr.

The entire process for processing the reception signals sp of the processing unit 20 is described here by a division into functional blocks consisting of at least delay calculators 115, summation block 200, and controller 300, surrounded by other functional blocks of which some are optional, but this processing process may be implemented in one or several computing units depending on the architecture defined by the skilled technician. In particular, this processing process may be implemented in dedicated hardware such as FPGA processors, in computing hardware such as a DSP processor, or in a standard processor. The power of today's FPGAs, DSPs, and microprocessors allows extremely fast calculations.

By repeating the processing process for a plurality of target points C based on the same reception signals sr recorded after a single transmission sequence as described above, it is possible to construct an image of the medium.

Thus, in the method for detecting discontinuities, the processing step for reception signals is iterated for a plurality of target points, in order to establish an image of the medium that is representative of the different detection levels.

Since this processing process for reception signals is purely computational, this process can be extremely fast. Scanning the product medium M to detect discontinuities can be very fast, which makes it possible to probe a product quickly. For example, it becomes possible to probe a product that is moving relative to the probe or vice versa.

We will now explain the operation of interference reduction block 150 (referred to as "IRB") of system 100 of FIG. 1. Interference reduction block 150 has the object in particular of reducing the interference that may occur when several discontinuities are located within region of interest ROI of medium M. We consider the number of discontinuities in the medium to be Nd.

To simplify the explanations, we will assume in this part that the excitation sequence includes only one transmission of a pulse by a single transmit transducer Te (Ne=1), but that there are three discontinuities inside the medium (Nd=3).

Figure 9:
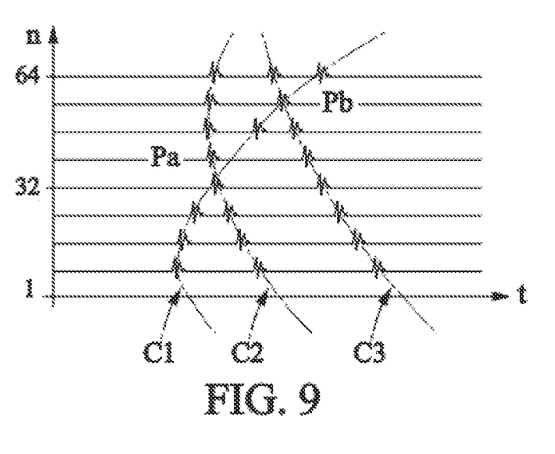
FIG. 9 is a timing diagram of the reception signals in the case of several discontinuities in the medium and a single excitation by a single transmit transducer.

Thus, in this case, FIG. 9 (similar to FIG. 3) represents the N reception signals sr obtained and stored in memory 130 following transmission from a single transmit transducer Te, in the presence of three discontinuities in medium M of the product. FIG. 9 shows a simplified representation of some of the 64 reception signals $sr_1$ to $sr_{64}$, to avoid too high of a density of the plots in this figure.

This figure shows, for each receive transducer Tr, a reception signal sr containing three pulses corresponding to the three returns from the three discontinuities. Each discontinuity has a different spatial position in the medium, which is expressed in FIG. 9 by three curves of pulse peaks in the direction of the N transducers (one for each discontinuity): curves C1, C2 and C3. Unlike the curves for multiple pulse transmissions in FIG. 3, these curves may intersect, which produces interference at the points of intersection Pa and Pb in FIG. 9.

Of course, it will be understood that when there are several transmission pulses (Ne), this multiplies the number of intersections and interferences between the various curves.

Figure 10:
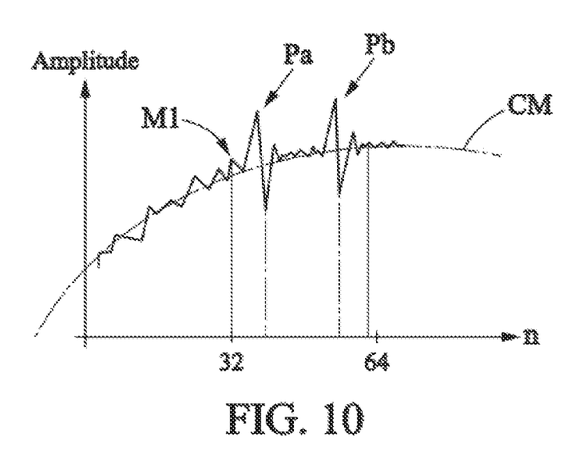
FIG. 10 is an example of a curve of peaks plotted as a function of the transducers, for a target point in a first discontinuity.

Thus, if the portions of the signals around curve C1 are extracted by the delay calculation method explained above, it is possible, for target point C focused on the discontinuity corresponding to curve C1, to draw a curve of peaks M1 passing on average through all peaks of curve C1 or rather using the values of reception signals sr taken at times corresponding to the reception delay law (the delay calculation) for target point C on the first discontinuity.

This curve of peaks M1 in particular shows interference around the indices of transducers corresponding to points of intersection Pa and Pb.

This curve of peaks M1 is related to the shape and size of the discontinuity.

It is then possible to calculate a model curve CM which approximates the curve of peaks M1 by a mathematical equation, such as a polynomial equation. Techniques for approximating experimental curves by polynomial regression are well known.

Thus, model curve CM closest to curve of peaks M1 is determined, the model curve being a curve calculated by a polynomial equation, and corrected reception signals csr are calculated from model curve CM, which allows significantly reducing the interference.

The polynomial equation is for example a first-order (straight line), second-order (parabola), or third-order polynomial equation.

The determination of the nearest curve may be carried out by minimizing a distance between model curve CM and curve of peaks M1.

Thus, in summary, the method for detecting discontinuities is completed before the calculation of the focused signal, a step implemented for example by the interference reduction block and during which the interference between several discontinuities is reduced, by the process consisting of:

determining a curve of peaks in the reception signals as a function of the transducers, said curve being determined by identifying the peaks in the reception signals for a target point and according to the focal law, calculating a model curve which approximates the curve of peaks, and calculating corrected reception signals from the recorded reception signals and the model curve, said corrected reception signals then being used instead of the recorded reception signals in the processing of these signals to derive the level of detection.

We will now explain the operation of dynamic speed corrector 116 (identified as "Corr" in FIG. 1). The purpose of dynamic speed corrector 116 is in particular to correct the delay calculation in the case of movement of probe 10 relative to the product (medium M) or vice versa. This concerns the case of movement at constant speed in the longitudinal direction X. This is a very common case for the continuous inspection of metal sections or, for example, railway rails. The speed can therefore be very high (several tens of kilometers per hour). Without correcting the delay calculation, the estimation of the detection level is completely erroneous, and in the case of an image calculation, the resulting image is completely blurry.

For example, in the case of the delay calculation detailed above, the corrected focusing delay calculation is then still:

$$\text{Delay}=te+tem+tre+tadj$$

However, the outbound travel times tem and the return travel time tre are now:

$$tem=1/Va\cdot\text{sqrt}(((xe+dxm)-xc)^2+zc^2)$$

$$tre=1/Vr\cdot\text{sqrt}(((xr+drm+drA+drR)-xc)^2+zc^2)$$

where
- dxm is the movement of transmit transducer Te during time offset te of this transmit transducer,
- drm is the movement of the receive transducer Tr during time offset te of transmit transducer Te,
- drA is the movement of the receive transducer Tr during the outward travel of the wave between transmit transducer Te and target point C,
- drR is the movement of receive transducer Tr during the return travel of the wave between target point C and receive transducer Tr.

The above focusing delay is therefore now a function of movements dxm, drm, drA, drR which can be easily calculated from the movement speed of the product relative to probe 10.

The above delay calculation may be expressed as a memory index in memory 130 by multiplying outward travel time tem, return travel time tre, and time offset te, by a sampling frequency Fs in the case of a system sampled at such a constant sampling frequency.

Thus, system 100 retrieves from another system a speed measurement for the speed of the medium relative to the probe, or comprises a sensor for measuring this speed. This speed is supplied to dynamic speed corrector 116 which corrects delay calculator 115, for example with the formulas explained above.

The method for detecting discontinuities is then improved by the fact that the focusing delay is determined as a function of the speed of movement of the medium relative to the probe, or vice versa.

The invention claimed is:

1. Method for detecting discontinuities in a medium, this method being implemented using a probe comprising a plurality of transducers forming an active surface and able to transmit and receive an ultrasonic wave in the medium, and the method comprising the steps of:
   defining a transmission sequence wherein:
   a plurality of transmit transducers are chosen among the transducers of the probe, each transmit transducer of the plurality of transmit transducers having a determined spatial position such that the spatial positions of the plurality of transmit transducers are uniformly and randomly distributed over the active surface of the probe, and
   a time offset is defined for each transmit transducer of the plurality of transmit transducers, such that the time offsets of the plurality of transmit transducers are uniformly and randomly distributed over a predetermined transmission duration,
   transmitting the transmission sequence in the medium, by the plurality of transmit transducers,
   receiving and recording reception signals, by the plurality of transducers, in response to the transmission sequence transmitted in the medium,
   processing the reception signals according to the following process, wherein:
   for each transmit transducer, a focusing delay corresponding to a determined focal law for the transmit transducer is calculated, for a desired target point to be probed in the medium, and taking into account the time offset of the transmit transducer considered,
   a focused signal is calculated for each transmit transducer, which is the sum of the reception signals of the plurality of transducers of the probe, realigned by the focusing delay,
   a synthetic signal is calculated which is the sum of the focused signals from all the transmit transducers, and
   the synthetic signal is analyzed in order to thus derive a level of detection in the medium at the target point, and detection of a discontinuity is thus derived.

2. The method according to claim 1, further comprising, before the calculation of the focused signal, a step in which the interference between several discontinuities is reduced, by the process consisting of:
   determining a curve of peaks in the reception signals as a function of the transducers, said curve being determined by identifying the peaks in the reception signals for a target point and according to the focal law,
   calculating a model curve which approximates the curve of peaks, and
   calculating corrected reception signals from the recorded reception signals and the model curve, said corrected reception signals then being used instead of the recorded reception signals in the processing of these signals to derive the level of detection.

3. The method according to claim 2, wherein the model curve is a polynomial curve.

4. The method according to claim 3, wherein the focusing delay is determined as a function of the speed of movement of the medium relative to the probe, or vice versa.

5. System for detecting discontinuities in a medium, comprising a probe comprising a plurality of transducers able to transmit and receive an ultrasonic wave in the medium, and a processing unit connected to the probe, this processing unit comprising at least one memory for storing reception signals, and a controller for implementing the method according to claim 4.

6. System for detecting discontinuities in a medium, comprising a probe comprising a plurality of transducers able to transmit and receive an ultrasonic wave in the medium, and a processing unit connected to the probe, this processing unit comprising at least one memory for storing reception signals, and a controller for implementing the method according to claim 3.

7. The method according to claim 2, wherein the focusing delay is determined as a function of the speed of movement of the medium relative to the probe, or vice versa.

8. System for detecting discontinuities in a medium, comprising a probe comprising a plurality of transducers able to transmit and receive an ultrasonic wave in the medium, and a processing unit connected to the probe, this processing unit comprising at least one memory for storing reception signals, and a controller for implementing the method according to claim 7.

9. System for detecting discontinuities in a medium, comprising a probe comprising a plurality of transducers able to transmit and receive an ultrasonic wave in the medium, and a processing unit connected to the probe, this processing unit comprising at least one memory for storing reception signals, and a controller for implementing the method according to claim 2.

10. The method according to claim 1, wherein the focusing delay is determined as a function of the speed of movement of the medium relative to the probe, or vice versa.

11. System for detecting discontinuities in a medium, comprising a probe comprising a plurality of transducers able to transmit and receive an ultrasonic wave in the medium, and a processing unit connected to the probe, this processing unit comprising at least one memory for storing reception signals, and a controller for implementing the method according to claim 10.

12. The method according to claim 1, wherein the processing of the reception signals is iterated for a plurality of target points, in order to establish an image of the medium that is representative of the different levels of detection in said target points.

13. System for detecting discontinuities in a medium, comprising a probe comprising a plurality of transducers able to transmit and receive an ultrasonic wave in the medium, and a processing unit connected to the probe, this processing unit comprising at least one memory for storing reception signals, and a controller for implementing the method according to claim 12.

14. System for detecting discontinuities in a medium, comprising a probe comprising a plurality of transducers able to transmit and receive an ultrasonic wave in the medium, and a processing unit connected to the probe, this processing unit comprising at least one memory for storing reception signals, and a controller for implementing the method according to claim 1.

* * * * *